United States Patent [19]
Dietz

[11] 4,146,823
[45] Mar. 27, 1979

[54] REGULATED DEFLECTION CIRCUIT

[75] Inventor: Wolfgang F. W. Dietz, New Hope, Pa.

[73] Assignee: RCA Corporation, New York, N.Y.

[21] Appl. No.: 871,038

[22] Filed: Jan. 20, 1978

[51] Int. Cl.² .................. H01J 29/70; H01J 29/76
[52] U.S. Cl. ............................................. 315/408
[58] Field of Search ............. 315/399, 408, 409, 410

[56] References Cited
U.S. PATENT DOCUMENTS

| 3,919,599 | 11/1975 | Reh et al. | 315/387 |
| 3,950,673 | 4/1976 | Gries | 315/408 |
| 4,009,426 | 2/1977 | Bohringer | 315/408 |

Primary Examiner—Theodore M. Blum
Attorney, Agent, or Firm—Eugene M. Whitacre; Paul J. Rasmussen; Joseph Laks

[57] ABSTRACT

A controllable switch is coupled to a source of energy and a first terminal of a deflection circuit. A second switch is coupled in parallel with the first switch. The controllable switch is poled to conduct forward operating current, while the second switch is poled to conduct return current to the source. A control circuit controls the duration of conduction of the controllable switch for providing a controlled amount of energy to the deflection circuit. The deflection rate voltage at the first terminal commutates off the controllable switch; the second switch then conducts the return current.

8 Claims, 15 Drawing Figures

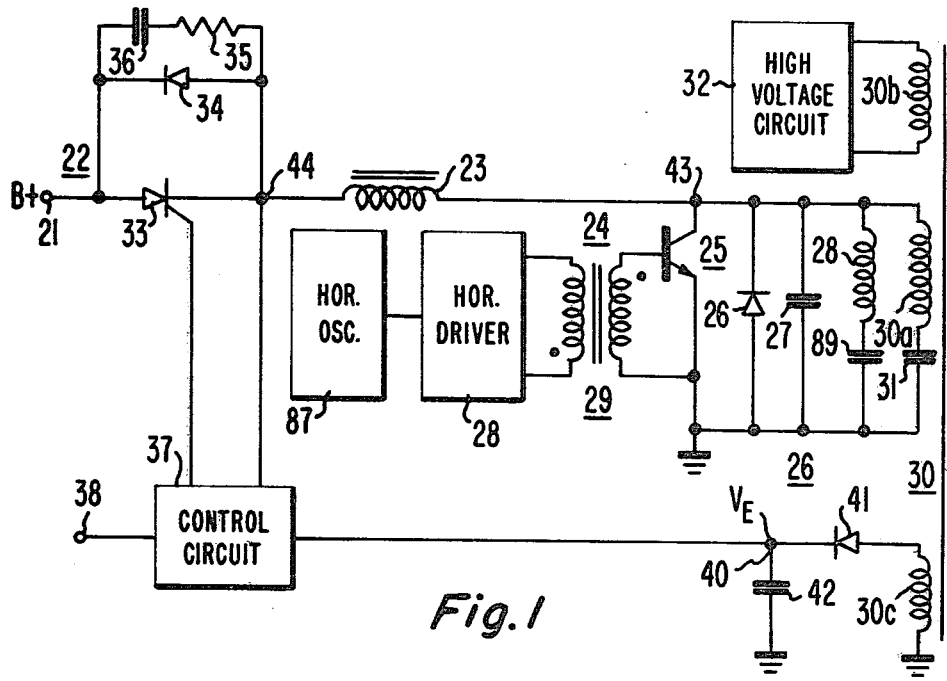
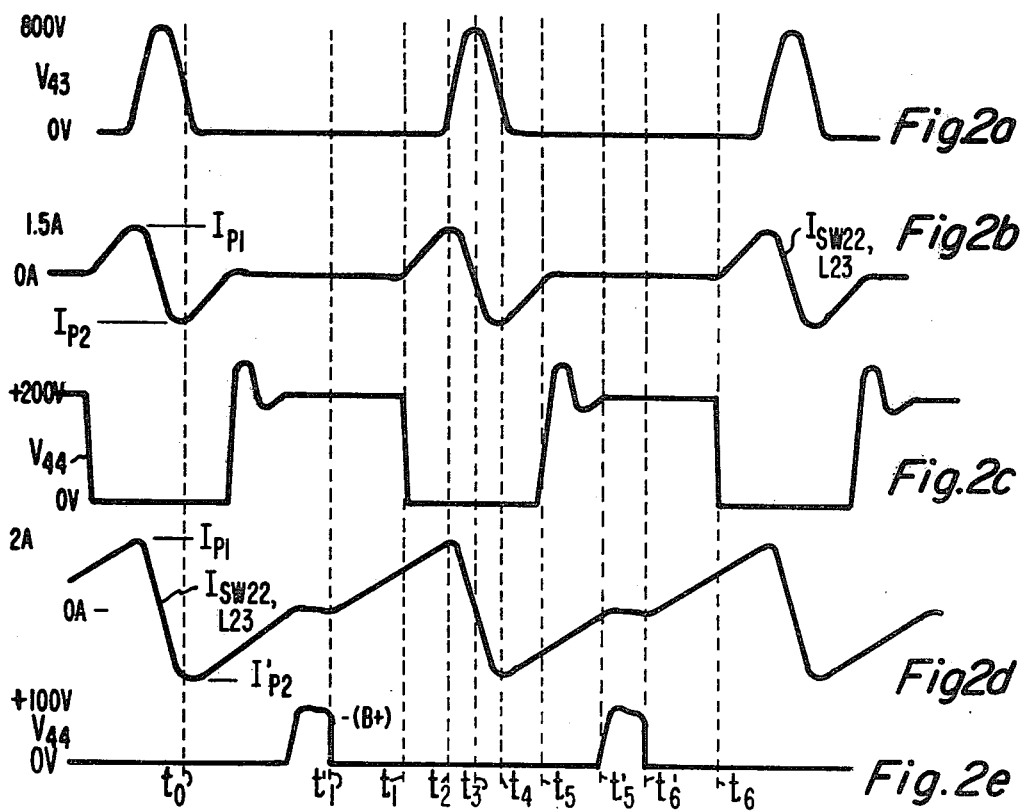

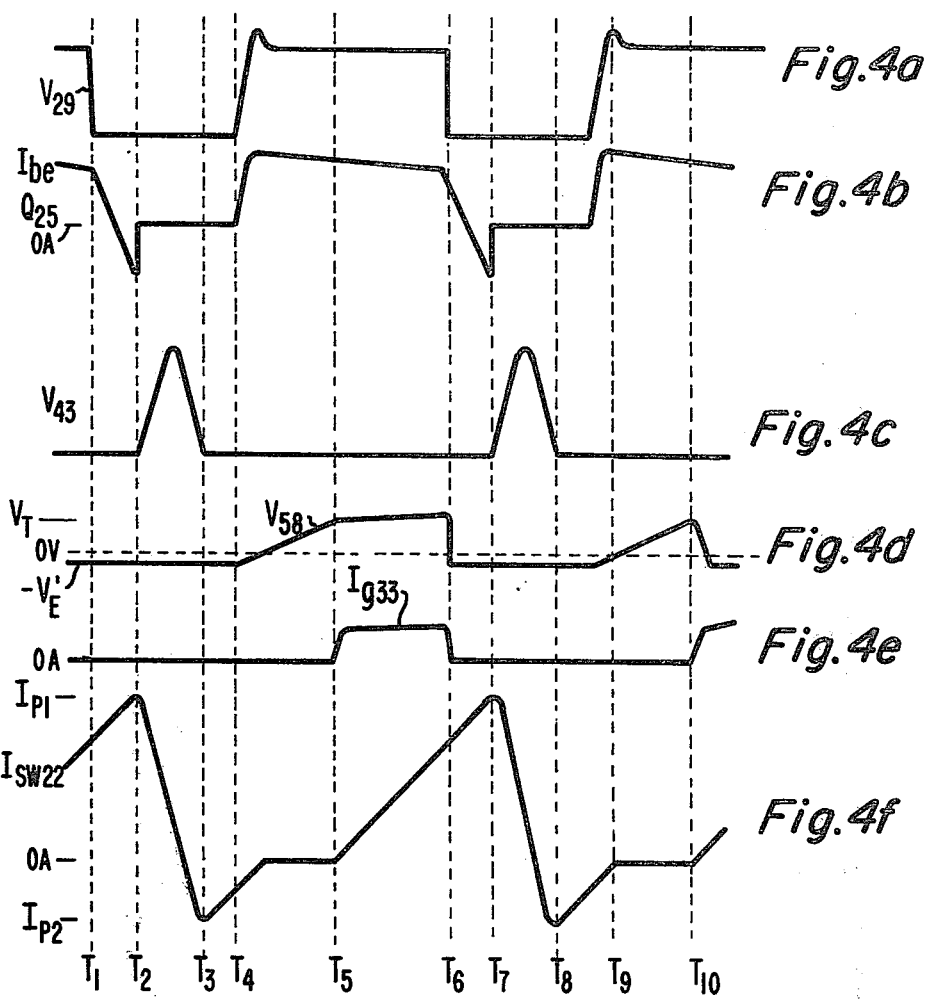
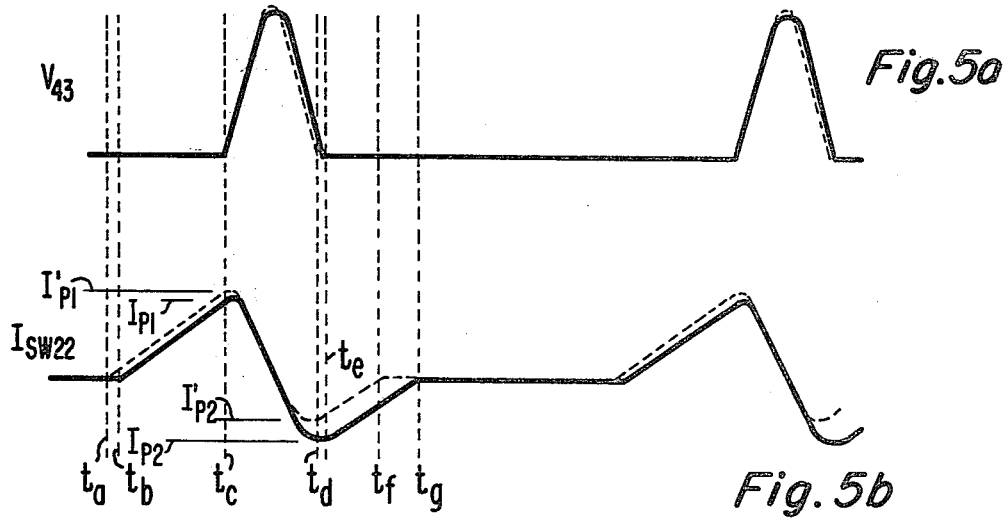

REGULATED DEFLECTION CIRCUIT

BACKGROUND OF THE INVENTION

This invention relates to regulated deflection circuits.

In many horizontal deflection circuits, energy is coupled to the deflection circuit from a source of B+ operating voltage through an input choke or horizontal output or flyback transformer. Conventional regulators for these circuits have included saturable reactors, the inductance of which is controlled to achieve regulation, or have included various types of switching arrangements.

One type of prior art regulator for SCR deflection, for example, provides for forward current regulation of the input operating current. In these forward regulators, an SCR is coupled in series with the B+ supply and the input choke. A phase controlled oscillator responsive to an energy level within the deflection circuit gates the SCR into conduction during the commutating interval of each deflection cycle. The SCR is commutated off during the noncommutating interval as the voltage across the commutating switch causes the current through the input choke and the SCR to decrease below the SCR holding current level. Regulation is achieved by varying the turn-on time or conduction angle of the SCR, thereby controlling the amount of energy provided by the B+ supply to the deflection circuit. Such a regulator is less suited for transistorized deflection, since the regulator SCR must be selected to withstand relatively large retrace pulses developed across the SCR after the SCR is commutated off.

Furthermore, forward current regulators without excess energy return capability exhibit a relatively large percentage change in conduction angle with changes in loading caused by various load circuits. The choice of control circuitry for the regulator is limited then to those capable of providing large conduction angle changes for the regulator SCR. Also, relatively large percentage conduction angle changes in transistorized deflection circuits due to load variation will result in relatively large percentage changes in peak output transistor collector currents causing undesirable raster distortion if not adequately compensated.

Another type of prior art regulator for transistorized deflection, for example, includes a regulating transistor in series with a flyback inductance and the unregulated B+ supply. Control signals to the transistor base vary the turn-on time within each trace interval for regulating the transistor conduction angle. The signals also turn off the transistor prior to the end of trace. A catch diode coupled to ground and the flyback inductance conducts the flyback inductance current when the transistor is nonconductive, during the retrace period and the beginning and ending intervals of the trace period.

In such a regulator design, the controlled switching element; i.e., the regulating transistor, must turn-off each deflection cycle while still conducting substantial amounts of operating current, resulting in undesirable switching dissipation and the production of relatively larger amounts of radio frequency interference (RFI).

To prevent the development of a retrace pulse across the regulating transistor, a relatively large inductance is required, thus necessitating a relatively large and more expensive iron core input choke, if a separate input inductance is used. The relatively large inductance would also require a relatively large conduction angle for the regulating transistor at a given load power consumption. Such large conduction angles may not be practical if the above transistor regulator design were to be adapted for SCR deflection circuits.

A third type of prior art regulator for SCR deflection, for example, provides for return current regulation of the input operating current. Typically, a diode is coupled in series with the input choke and the B+ supply. The diode conducts forward current during the commutating interval. A controlled switching element; i.e., an SCR, conducts return current to the B+ supply. Regulation is achieved by varying the turn-on instant during the latter portion of the noncommutating interval, thereby controlling the amount of energy returned to the supply and the net amount of energy coupled to the deflection circuit. Such regulators, however, are relatively unsuited for use in transistorized deflection systems because of the resulting relatively large undesirable modulation of the retrace pulses. Furthermore, relatively large retrace pulse voltages will be undesirably developed across the switching element during a portion of the retrace interval.

SUMMARY OF THE INVENTION

A first terminal of a deflection circuit has developed thereat a deflection rate voltage. A first controllable switch is coupled to a source of energy and to the first terminal and is poled for conducting forward operating current for transferring a controlled amount of energy to the deflection circuit from the source. An energy sensing circuit is responsive to an energy level of the deflection circuit and provides an error signal to a control means circuit. The control circuit controls the duration of conduction of the controllable means in response to the error signal for providing the controlled amount of energy. The control circuit provides a turn-on signal within each deflection cycle to the controllable switching means, and the controllable switching means is commutated off by the deflection rate voltage at the first terminal. A second switch is coupled in parallel with the controllable switch and is poled to conduct the return current when said controllable switch is commutated off.

BRIEF DESCRIPTION OF THE DRAWING

FIG. 1 illustrates a regulated deflection circuit embodying the invention;

FIGS. 2a–2e illustrate waveforms associated with the circuit of FIG. 1;

FIGS. 4a–4f, 5a, and 5b, illustrate waveforms associated with the circuit of FIG. 3.

DESCRIPTION OF THE INVENTION

Figure 3:
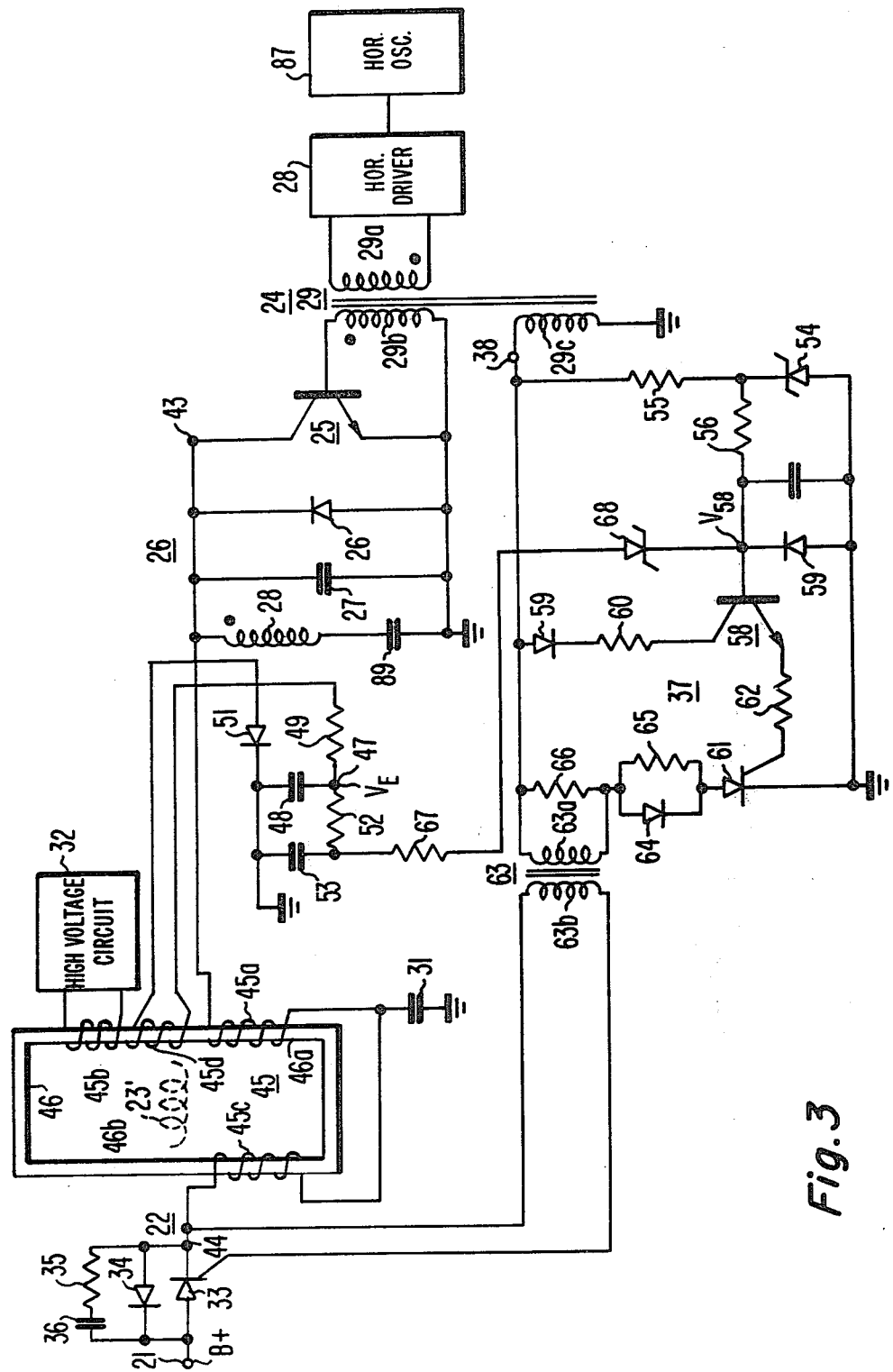
FIG. 3 illustrates another regulated deflection circuit embodying the invention.

In FIG. 1, an unregulated source of B+ supply voltage at a terminal 21 is series coupled through a bidirectional switch 22 and an input choke inductance 23 to a horizontal deflection circuit 24. Horizontal deflection circuit 24 illustratively comprises a transistorized deflection circuit and includes a horizontal output stage 26 comprising a horizontal output switching transistor 25, a damper diode 26, a retrace capacitor 27, and a series coupled horizontal deflection winding 28, and a trace capacitor 89. The deflection winding 28, trace and retrace capacitors 89 and 27 form a resonant circuit for reversing current in the winding during a resonant retrace interval.

A horizontal oscillator 87 provides synchronized horizontal signals to a horizontal driver 28 for providing horizontal drive signals to horizontal switching transistor 25 through a drive transformer 29.

A horizontal output or flyback transformer 30 comprises a primary winding 30a, a high voltage secondary winding 30b, and another secondary winding 30c. A DC blocking capacitor 31 is coupled to primary winding 30a, and a high voltage circuit 32 is coupled to secondary winding 30b for generating an ultor potential for beam current.

During each deflection cycle, a controlled amount of energy is coupled from the B+ supply through bidirectional switch 22 and is first stored as magnetic energy in inductance 23 and is then transferred to horizontal deflection circuit 24 to replenish the energy consumed both in the horizontal deflection 24 and load circuits coupled to flyback transformer 30, such as high voltage circuit 32.

Bidirectional switch 22 includes a first controllable switch 33 forming a first controllable conductive path comprising a silicon controlled rectifier poled to conduct forward operating current and a second switch 34 forming a second conductive path comprising a diode coupled in parallel with SCR 33. Diode 34 is poled to conduct return current; i.e., current in a direction opposite that of SCR 33. A transient damping resistor 35 and a capacitor 36 is coupled across bidirectional switch 22. SCR 33 is gated into conduction each deflection cycle by control signals obtained from a control circuit 37. The output of control circuit 37 is synchronized with horizontal deflection by deflection rate signals, such as, for example, horizontal retrace pulses, obtained at an input terminal 38. Regulation for line and load variations is achieved by pulse width modulating the gating pulses in response to an error voltage $V_E$ developed at a terminal 40. The error voltage is representative of an energy level of deflection circuit 24 and comprises a half-wave rectified and filtered retrace pulse developed across secondary winding 30c of an energy sensing circuit comprising winding 30c, a diode 41, and a capacitor 42.

The voltage $V_{43}$ at a terminal 43 of horizontal deflection circuit 24 at the collector of output transistor 25 is illustrated in FIG. 2a and comprises a deflection rate voltage. $V_{43}$ equals zero, during the horizontal trace interval, from near time $t_0$ to near time $t_2$. In this interval, both damper diode 26 and switching transistor 25 are conductive during their respective portions. $V_{43}$ equals a pulse voltage, during the horizontal retrace interval, from near time $t_2$ to near time $t_4$, when transistor 25 is made nonconductive.

Depending on the magnitude of the error voltage $V_E$, at a time $t_1$ within the trace interval, SCR 33 is gated into conduction. SCR 33 conducts forward operating current from the B+ voltage source to store energy in inductance 23, forward operating current being defined as a current flowing in a direction that removes energy from the B+ voltage source. As illustrated in FIG. 2b, the current $I_{SW22}$ through switch 22 and the identical current $I_{L23}$ through inductance 23 from time $t_1$ comprises a forward positive current flowing to ground through switching transistor 25. The current linearly increases until time $t_2$ with a slope directly proportional to the B+ voltage and inversely proportional to the inductance magnitude.

Near time $t_2$, output switching transistor 25 becomes nonconductive, developing a resonant retrace voltage at terminal 43. Shortly after the beginning of retrace, at time $t_2$, the forward operating current $I_{L23}$ will have reached a maximum magnitude $I_{P1}$ and begin to decrease in a resonant manner. At time $t_3$, SCR 33 is commutated off as the current $I_{L23}$ reaches zero and begins to reverse direction.

At the same time $t_3$ that SCR 33 is commutated off, diode 34 begins to conduct a negative return current portion of $I_{L23}$. A maximum return current magnitude $I_{P2}$ is reached near the end of retrace at time $t_4$. Because of dissipative losses and loading during retrace by deflection circuit 24 and high voltage circuit 32, the maximum return current magnitude $I_{P2}$ at time $t_4$ will be less than the maximum forward operating current magnitude $I_{P1}$. At the beginning of the trace interval starting near time $t_4$, the deflection rate voltage at terminal 43 equals zero. With diode 34 conducting, the voltage at terminal 44 equals the B+ voltage at terminal 21. The return current thus begins to decrease in magnitude.

Diode 34 is commutated off at time $t_5$ when the current $I_{L23}$ equals zero and attempts to reverse direction. The B+ voltage source is decoupled from inductance 23 and horizontal deflection circuit 24 from times $t_5$–$t_6$, at which time another control signal gates SCR 33 into conduction.

As illustrated by FIG. 2b, energy is drawn from the B+ source from times $t_1$–$t_2$ and stored in the magnetic field of inductance 23. During retrace from times $t_2$–$t_4$, the current in inductance 23 reverses direction, and a portion of the stored magnetic energy is transferred in a resonant manner to load circuits, such as horizontal deflection circuit 24 and high voltage circuit 32. The remaining stored energy in inductance 23 at the end of the retrace interval is then returned to the B+ supply during the interval $t_4$–$t_5$.

As illustrated in FIG. 2c, no retrace pulse voltage is developed across bidirectional switch 22. The voltage $V_{22}$ across bidirectional switch 22 equals zero when bidirectional switch 22 is conducting at the end of a trace interval, during retrace and at the beginning of the next trace interval and equals the B+ voltage when bidirectional switch 22 is nonconducting during the middle portion of the trace interval. No undue voltage stress during retrace is imposed on bidirectional switch 22.

Both SCR 33 and diode 34 become nonconductive at an instant when the current through the respective elements equals zero, resulting in relatively little resistive dissipation and RFI radiation.

FIGS. 2d and 2e illustrate current waveforms through bidirectional switch 22 and inductance 23 and voltage across bidirectional switch 22 for low line conditions, illustratively B+ = +100 VDC. As illustrated in FIG. 2d, control signals from control circuit 37 gate SCR 33 into conduction at an earlier time $t_1'$ when compared to the high line condition of B+ = +200 VDC, illustrated previously in FIG. 2b. Current increases until the beginning of retrace at time $t_2$, but with a less steep slope than in the high line condition reaching a maximum magnitude of $I_{P1}'$. Current reverses direction during retrace from times $t_2$–$t_4$, reaching a maximum in the opposite negative direction of a magnitude $I_{P2}'$ less than $I_{P1}'$, that depends upon the loading caused by horizontal deflection circuit 24 and high voltage circuit 32. Diode 34 conducts return current from times $t_4$–$t_5'$, and bidirectional switch 22 becomes nonconductive from time $t_5'$ until time $t_6'$, at which time another control signal from control circuit 37 again gates SCR 33 into conduction.

FIG. 3 illustrates another regulated deflection circuit embodying the invention. Components of the circuits of FIGS. 1 and 3 operating in similar manner have been identically labelled.

The separate input inductance 23 has been replaced in FIG. 3 by a transformer 45. Transformer 45 may comprise, as illustrated in FIG. 3, the horizontal output or flyback transformer of horizontal deflection circuit 24. A primary winding 45a is wound on a leg 46a of a rectangular core 46 of flyback transformer 45. On the same core leg tightly coupled magnetically with primary winding 45a is a high voltage secondary winding 45b coupled to high voltage circuit 32.

On a core leg 46b, opposite leg 46a, is wound an input winding 45c. One terminal of winding 45c is coupled to bidirectional switch 22; another terminal is coupled to the junction of primary winding 45a and DC blocking capacitor 31. Because input winding 45c is wound on a leg opposite that of primary winding 45a, the two windings are relatively loosely coupled magnetically with each other. A relatively large leakage inductance is developed, schematically represented in FIG. 3 by the dashed symbol 23' and functions in a similar manner as the input choke inductance 23 of FIG. 1. The magnitude of the leakage inductance is determined by such factors as the core geometry and turns ratio of windings 45a and 45c.

The error voltage $V_E$ for control circuit 37 is developed at a terminal 47 of FIG. 3, at the junction of a filter capacitor 48 and a resistor 49 of a half-wave rectifier circuit comprising capacitor 48, resistor 49, a winding 45d and a diode 51; winding 45d comprises a secondary winding of flyback transformer 45. Diode 51 rectifies the magnetically coupled retrace pulses across winding 45d to produce a substantially DC error voltage $V_E$ at terminal 47 that is negative with respect to a ground reference point. Further filtering is achieved by a resistor 52 and a capacitor 53 coupled across capacitor 48.

Synchronized horizontal rate drive signals $V_{29}$, illustrated in FIG. 4a, obtained from horizontal driver 28, are magnetically coupled from the primary winding 29a of driver transformer 29 to secondary windings 29b and 29c. A first portion of drive signals $V_{29}$ from times $T_1-T_4$ is used to later initiate horizontal retrace at time $T_2$, as illustrated in FIGS. 4a–4c. The interval $T_1-T_2$ represents the reverse base conduction time of horizontal output switching transistor 25 due to stored base charge, as illustrated in FIG. 4b. A second portion of drive signals $V_{29}$, beginning at time $T_4$ and extending to time $T_6$, is used to forward bias the base-emitter junction of output switching transistor 25 for conduction during the latter portion of horizontal trace.

Secondary winding 29c of coupling transformer 29 is coupled to input terminal 38 of control circuit 37. The drive signals $V_{29}$ coupled to terminal 38 serve as horizontal rate synchronizing signals for turning on SCR 33 within the trace interval of each deflection cycle. The drive signals at terminal 38 are coupled to a zener diode 54 through a resistor 55. The voltage at the cathode of zener diode 54 is a well-defined deflection rate square-wave voltage obtained from the drive voltage $V_{29}$ and is positive from times $T_4-T_6$ and zero from times $T_6-T_9$.

An RC integrating network comprising a resistor 56 and a capacitor 57 is coupled across zener diode 54. The base of a control transistor 58 is coupled to the junction of resistor 56 and capacitor 57. A discharge diode 59 is coupled across capacitor 57. Collector voltage for control transistor 58 is obtained from the drive signal voltage $V_{29}$ at terminal 38 through a diode 59 and a resistor 60. The emitter of control transistor 58 is coupled to the gate of an SCR 61 through a resistor 62. The anode of SCR 61 is coupled to a primary winding 63a of a transformer 63 through a parallelly coupled diode 64 and a resistor 65. A damping resistor 66 is coupled across primary winding 63a. A secondary winding 63b is coupled across the gate and cathode terminals of SCR 33 of bidirectional switch 22.

As illustrated in FIG. 4d, the voltage $V_{58}$ at the base of control transistor 58, beginning at time $T_4$, comprises an integrated positive-going sawtooth voltage superimposed on a negative DC voltage $-V_E'$, obtained from the error voltage $V_E$ at terminal 47 through resistor 52, a resistor 67 and a clipping zener diode 68.

At time $T_5$, the sawtooth voltage $V_{58}$ has increased sufficiently to reach the voltage level $V_T$, at which instant control transistor 58 turns on, coupling a turn-on gating pulse to SCR 61. As illustrated by the gate current waveform $I_{g33}$ of the gate of SCR 33 of FIG. 4e, when SCR 61 conducts, a control signal is coupled from transformer 63 to the gate of SCR 33, gating SCR 33 into conduction.

As illustrated in FIG. 4f, forward operating current linearly increases through SCR 33 and windings 45c and 45a of flyback transformer 45 from times $T_5-T_7$, reaching a peak magnitude $I_{P1}$ at the end of trace at time $T_7$.

Current reverses during retrace from times $T_7-T_8$, reaching a peak magnitude $I_{P2}$ less than $I_{P1}$ depending on the loading by horizontal deflection circuit 24 and high voltage circuit 32. Bidirectional switch 22 becomes nonconductive when the return current through diode 34 decreases to zero at time $T_9$. Another control signal is coupled to SCR 33 to again gate SCR 33 into conduction at time $T_{10}$.

Variations in the error voltage $V_E$ and thus in the negative voltage $-V_E'$ will cause the instant at which the sawtooth voltage $V_{58}$ reaches the voltage $V_T$ near time $T_5$ to vary, thereby controlling the amount of energy transferred from the B+ supply for achieving regulation.

A feature of the invention is that through use of the bidirectional switch 22, illustrated in FIGS. 1 and 3, only relatively small conduction angle changes for SCR 33 of bidirectional switch 22 are required from minimum loading to full-loading conditions. The solid waveforms of FIGS. 5a and 5b illustrate a minimum loading condition. SCR 33 begins conducting forward operating current at time $t_b$, reaching a maximum magnitude $I_{P1}$ at time $t_c$. Current reversal occurs during retrace from times $t_c-t_e$. A negative maximum magnitude current $I_{P2}$ is reached at time $t_e$. Diode 34 conducts reverse current during the latter portion of retrace and the first portion of trace until time $t_g$, at which time bidirectional switch 22 becomes nonconductive.

The dashed waveforms of FIGS. 5a and 5b illustrate a maximum loading condition. SCR 33 is gated into conduction at a slightly earlier instant $t_a$ and reaches a positive peak magnitude $I_{P1}'$ at time $t_c$. Retrace occurs for a slightly shorter interval from times $t_c-t_d$ due to a slight retrace pulse modulation under heavy loading. Current reversal is achieved by time $t_d$, reaching a negative peak magnitude of $I_{P2}'$ less than $I_{P1}'$. Bidirectional switch 22 becomes nonconductive at time $t_f$.

As illustrated in FIG. 5b, the difference in peak current $\Delta I_P = I_{P2} - I_{P2}'$ in the input inductance between minimum and maximum loading conditions at the end of retrace represents the difference in amounts of energy transferred to the load circuits during retrace under the two load conditions. Thus, variations in loading principally result in relatively large variations in peak return current at the end of retrace, rather than relatively large percentage changes in conduction angle for SCR 33 of bidirectional switch 22.

Typical values of selected components for the circuit of FIG. 1, producing the waveforms of FIG. 2 are as follows.

$L_{23}$–1.1 millihenries
$L_{28}$–0.9 millihenries
$C_{27}$–0.039 microfarads
$C_{89}$–1.5 microfarads
$C_{31}$–1.5 microfarads
$L_{30a}$–1.9 microfarads Typical values of selected components for the circuit of FIG. 3, producing the waveforms of FIG. 5 are as follows $L_{23}'$–1.1 millihenries
$L_{45a}$–1.9 millihenries
$L_{45c}$–1.9 millihenries
$L_{28}$–0.9 millihenries
$C_{27}$–0.039 microfarads
$C_{89}$–1.5 microfarads
$C_{31}$–1.5 microfarads
Turns ratio of winding 45c to winding 45a — 1:1 B+ voltage — 150 VDC
$I_{P1}$ — +3.8 Amps
$I_{P2}$ — −3.2 Amps
Average power drawn minimum loading — 22.5 Watts
Average load current under maximum loading — 75 Watts
$V_{43}$ peak — 800 Volts
For B+ voltage = 235 VDC and minimum loading:
Average power drawn = 20 Watts
$I_{P1}$ = +2.2 Amps
$I_{P2}$ = −2.0 Amps
$V_{43}$ peak = 800 Volts
For B+ voltage = 235 VDC and maximum loading:
Average power drawn = 115 Watts
$I_{P1}'$ = +2.7 Amps
$I_{P2}'$ = −1.25 Amps

What is claimed is:

1. A regulated deflection circuit, comprising:
a deflection circuit, a first terminal of said deflection circuit having developed thereat a deflection rate voltage;
a source of energy for said deflection circuit;
first controllable switching means coupled to said source of energy and said first terminal and poled for conduction of forward operating current for transferring a controlled amount of energy to said deflection circuit from said source;
energy sensing means responsive to an energy level of said deflection circuit for providing an error signal;
control means coupled to said first controllable switching means and responsive to said error signal for controlling the duration of conduction of said first controllable switching means for providing said controlled amount of energy, said control means providing a turn-on signal within each deflection cycle to said first controllable switching means; and
second switching means coupled in parallel with said first controllable switching means and poled for conduction of return current to said source of energy, said first controllable switching means commutated off by said deflection rate voltage, said second switching means conducting said return current when said first controllable switching means is commutated off.

2. A circuit according to claim 1, wherein said first terminal is coupled to an input inductance for storing a predetermined amount of energy in said input inductance from said source of energy through said first controllable switching means during a first interval of said deflection cycle.

3. A circuit according to claim 2, wherein said deflection circuit comprises a deflection winding coupled to a resonant circuit for reversing scanning current in said deflection circuit, a portion of said predetermined amount of energy in said input inductance being transferred to said deflection circuit through said resonant circuit during a resonant interval, the remainder of said predetermined amount of energy being returned to said source through said second switching means.

4. A circuit according to claim 3, wherein said deflection circuit comprises a transistorized horizontal deflection circuit with a horizontal output transistor coupled to said input inductance for conducting said forward operating current during said first interval.

5. A circuit according to claim 1, wherein said deflection circuit comprises:
a drive transformer;
a horizontal driver circuit coupled to said drive transformer and responsive to synchronized horizontal rate signals for developing a horizontal drive signal in first and second windings of said drive transformer;
a horizontal output transistor coupled to said first winding, said horizontal drive signal biasing said horizontal output transistor into and out of conduction during each deflection cycle, said control means coupled to said second winding for synchronizing said turn-on signal to said horizontal drive signals.

6. A regulated deflection circuit comprising:
a deflection winding;
deflection circuit coupled to said deflection winding for generating scanning current in said deflection winding each deflection cycle;
output switching means coupled to said deflection circuit for initiating a first portion of each deflection cycle;
a source of energy;
a storage inductance;
bidirectional switching means series coupled with said source of energy and said storage inductance, said output switching means coupled to one of said bidirectional switching means and said storage inductance, a first controllable switching portion of said bidirectional switching means poled in a direction that will transfer energy from said source to said inductance through said first controllable switching means, a second switching portion of said bidirectional switching means poled in a direction that will return energy from said inductance to said source through said second switching means; and
control means coupled to said first controllable switching portion and responsive to an error voltage representative of an energy level of said deflection circuit for switching said first switching portion into conduction at a controllable instant in an interval when said output switching means is in a first conductive state for regulating the amount of energy transferred from said source.

7. A regulated deflection circuit comprising:
a deflection winding;
a resonant circuit coupled to said deflection winding;
an output switching means coupled to a first terminal of said resonant circuit, a resonant energy exchange occurring and a resonant voltage being developed at said first terminal during a nonconductive interval when said output switching means is switched to a nonconductive state;
a source of energy;
an inductance coupled to said first terminal;
controllable bidirectional switching means coupled to one of said source of energy and said inductance, an increasing amount of forward operating current flowing from said source to said inductance through a first controllable conductive path of said bidirectional switching means when said output switching means is in a conductive state; and
control means coupled to said bidirectional switching means and responsive to an energy level of said deflection circuit for switching said first controllable conductive path into conduction at a controlled instant during a conductive interval when said output switching means is in said conductive state for regulating the peak amount of operating current flowing in said inductance at the end of said conductive interval, a resonant energy exchange between said inductance and said resonant circuit occurring when said output switching means is switched to a nonconductive state for transferring a controlled amount of energy to said deflection circuit, said resonant voltage reversing the current direction in said inductance, a second path of said bidirectional switching means returning current from said inductance to said source at the completion of said resonant energy exchange.

8. A regulated deflection circuit comprising:
a deflection winding;
means coupled to said deflection winding for generating scanning current;
a resonant circuit coupled to said deflection winding;
output switching means coupled to a first terminal of said resonant circuit, a resonant energy exchange occurring and a resonant voltage being developed at said first terminal during a nonconductive interval of said output switching means;
a source of energy;
an inductance coupled to said first terminal;
controllable bidirectional switching means coupled to one of said source of energy and said inductance, including a first controllable rectifier poled to transfer energy from said source and a second rectifier poled to return energy to said source; and
control means coupled to a control terminal of said bidirectional switching means and responsive to an energy level of said deflection circuit for providing a turn-on signal to said bidirectional switching means for storing in said inductance a controlled amount of energy from said source during a conductive interval of said output switching means, said resonant voltage reversing the current in said inductance, said resonant energy exchange transferring at least a portion of said controlled amount of energy from said inductance to said deflection circuit, the remainder of said controlled amount of energy being returned by said bidirectional switching means to said source.

* * * * *